United States Patent [19]
Kurkjian, Jr.

[11] 3,823,912
[45] July 16, 1974

[54] VALVE FOR INSTALLATION IN FLUME

[75] Inventor: Gregory A. Kurkjian, Jr., Wheaton, Ill.

[73] Assignee: Henry Pratt Company, Aurora, Ill.

[22] Filed: June 7, 1973

[21] Appl. No.: 367,777

[52] U.S. Cl............................... 251/305, 251/143
[51] Int. Cl............................................. F16k 1/22
[58] Field of Search............... 61/12, 14, 15, 16, 22, 61/25; 251/143, 305

[56] References Cited
UNITED STATES PATENTS
2,584,364  2/1952  Osborn.................................. 61/25

*Primary Examiner*—Harold W. Weakley
*Attorney, Agent, or Firm*—Hofgren, Wegner, Allen, Stellman & McCord

[57] ABSTRACT

A valve, such as a butterfly valve, for installation in a flume or the like. The valve includes a body having a shape substantially corresponding to the cross section of the flume in which the valve is to be installed, the valve body being slightly larger in size about a majority of its periphery than the cross section of the flume so as to be receivable in a preformed recess in the wall of the flume. The valve body includes a fluid passage and a valve disc journalled therein for movement between open and closed positions and the body is provided with a tongue extending outwardly from the body at the periphery thereof in a direction substantially parallel to the fluid passage, which tongue is apertured for receipt of bolts which, in turn, may be fastened to the flume wall by means of conventional concrete anchoring elements.

5 Claims, 2 Drawing Figures

PATENTED JUL 16 1974 3,823,912

VALVE FOR INSTALLATION IN FLUME

BACKGROUND OF THE INVENTION

This invention relates to valves for installation in flumes or channels or the like, and more particularly, to a butterfly valve for such installation having improved mounting means to facilitate easy installation.

Control of the flow of fluid in channels or flumes or the like has been achieved through the use of valves installed in the flumes. However, because the flumes or channels are typically formed of concrete or the like, installation of fluid flow regulating valves has frequently been exceedingly difficult. Oftentimes, the valve has been cast in place when the flume is formed of concrete. This practice is time-consuming and expensive by reason of the necessity of having to exercise great care during the casting process to preclude damage to the valve. In addition, it is frequently necessary to delay the construction of a flume to await arrival of a valve designed therefor before the flume may be cast. Such waiting decreases the efficiency of the construction process and therefore increases the cost thereof.

Where it has been attempted to install the valve after the flume has been constructed, other difficulties present themselves. For example, it may be necessary during the flume construction process to set up relatively elaborate forms to provide means whereby the valve may be subsequently secured to the walls of the flume. This process is, of course, time-consuming and expensive.

SUMMARY OF THE INVENTION

It is the principal object of the invention to provide a new and improved valve for installation in a flume. More specifically, it is an object of the invention to provide such a valve that may be easily installed in a flume after the flume has been constructed and without the need for the use of elaborate forms during the construction of the flume.

An exemplary embodiment of the invention achieves the foregoing objects through a construction including a valve body which is designed to be easily installed in a preformed groove in the wall of a flume or the like. The valve body has a shape corresponding to the cross section of the flume in which it is to be installed and is slightly larger in size about a majority of its periphery, the size corresponding to the size of that of the groove in a flume wall.

In the preferred embodiment, the valve is a butterfly valve and, accordingly, the body has a fluid passage extending therethrough. A valve disc is journalled in the valve body for rotative movement between open and closed positions.

For mounting purposes, the valve body includes a tongue which extends outwardly from the valve body at the periphery in a direction substantially parallel to the fluid passage of the valve. The tongue is apertured at a series of spaced locations so that bolts may be extended through the apertures to be threadably received in anchors located in corresponding locations in a preformed groove in the wall of a flume. Preferably, the tongue is formed by one leg of an L-shaped angle iron with the other leg thereof being secured to the valve body.

According to a preferred embodiment, the valve body is defined by an outwardly open, C-shaped channel which may be filled with grout at the time of installation of the valve in a preformed groove in the flume to form a seal between the valve body and the walls of the flume.

Other objects and advantages will become apparent from the following specification taken in conjunction with the accompanying drawings.

DESCRIPTION OF THE PREFERRED EMBODIMENTS

Figure 1:
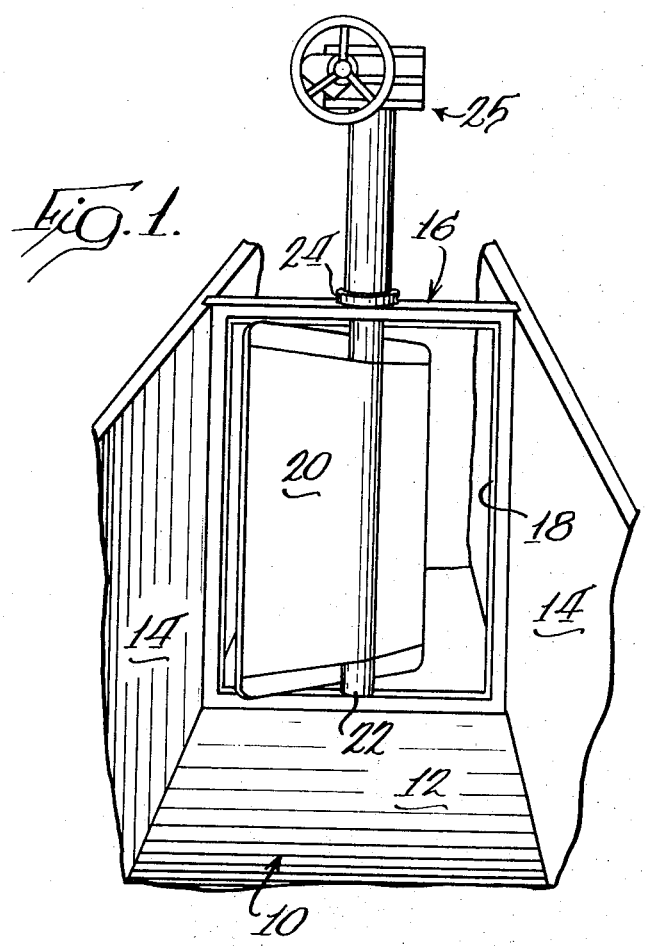
FIG. 1 is a perspective view of a flume having a valve made according to the invention installed therein.

With reference to FIG. 1, a flume, generally designated 10, is seen to include a bottom wall 12 and opposed side walls 14. Within the flume 10 is a valve made according to the invention and the same includes a valve body, generally designated 16, having a fluid passage 18 extending therethrough. Located within the fluid passage 18 is a valve disc 20 which is journalled as at 22 and 24 on opposite sides of the valve body 16 for rotation within the valve body 18 between open and closed positions. Extending upwardly from the valve body 16 is a valve disc operating mechanism, generally designated 25, which may be of conventional construction.

According to the invention, the flume 10 will normally be formed of a pourable, settable material such as concrete and the same is cast in forms in the usual manner. Internaklly, each of the walls 12 and 14 are provided with a groove 26 for receipt of at least a portion of the valve body 16.

Figure 2:
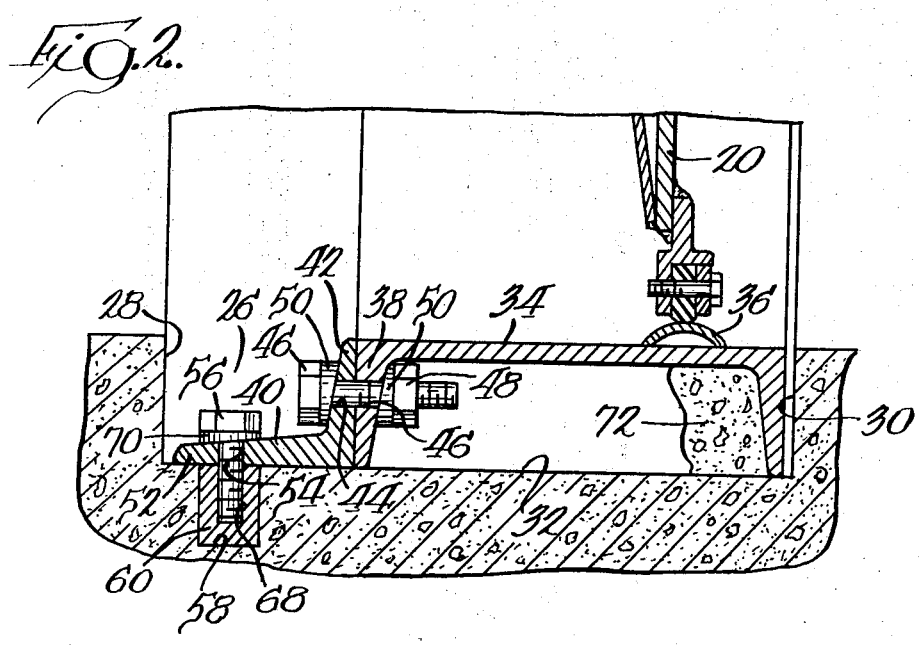
FIG. 2 is an enlarged, sectional view of a portion of the valve showing the manner in which the same is installed in a flume.

With reference now to FIG. 2, the groove 26 is seen to include opposed side walls 28 and 30 respectively and a bottom wall 32. According to the embodiment of the invention illustrated in FIG. 2, the valve body 16 may be formed in a rectangular configuration through the use of a C-shaped channel beam 34 to have a shape conforming to the cross sectional shape of the flume 10 as seen in FIG. 1 and, as seen in FIG. 2, to have a size corresponding approximately to that of the groove 26. In addition, the width of the valve body 16 should be less than the distance between the side walls 28 and 30 of the groove 26.

The disc 20, by any suitable construction, carries a peripheral seal 36 which sealingly engages the base of the channel 34 defining the valve body 16 when the disc 20 is in the closed position.

To firmly secure the valve body 16 within the groove 26, one leg 38 of the channel 34 mounts an L-shaped angle iron 40. More particularly, one leg 42 of the angle iron 40 includes a plurality of spaced apertures 44 (only one of which is shown) which may be aligned with similarly spaced apertures 46 (again, only one of which is shown) in the leg 38 so that the angle iron 40 may be joined to the leg 38 by means of bolts 46 and nuts 48. Depending upon the precise shape of the legs 38 and 42, contoured spacers 50 may be employed to equally distribute the load posed by the tightening of the bolts 46 and nuts 48.

The second leg 52 of the angle iron 40 extends outwardly from the periphery of the valve body in a direction parallel to the fluid passage 18 and is receivable in the groove 26 along with the valve body 16. The leg 52 is provided with a plurality of spaced apertures 54 for receipt of securing means in the form of bolts 56 for securing the valve body 16 within the groove 26. Specifically, after the flume has been formed, and before the valve is to be installed, the bores 58 may be drilled in the material defining the flume in the bottom wall 32 of the groove at locations corresponding to the spacing of the apertures 54 in the tongue 52. The bores 58 are then provided with conventional anchors 60 having an internal threaded bore 68 for receipt of the bolts 56. Again, contoured spacers 70 may be employed if necessary.

The valve may be easily installed as follows. The flume 10 may be constructed with the preformed groove 26 therein. The anchors 26 are appropriately installed and the valve body 16 lowered into the groove. The bolts 56 may then be threaded into place to securely hold the valve within the groove. At this time, or at the time that the valve is initially placed in the groove 26, grout 72 may be located in the concave side of the channel 34 to provide an effective seal between the valve body 16 and the walls of the flume.

From the foregoing, it will be appreciated that a valve made according to the invention may be easily installed in a preformed groove in a flume thereby eliminating the difficulties of elaborate forms and/or casting in place. It should also be recognized that while the invention has been described specifically as a butterfly valve, it is not so limited. For example, other valves wherein a valve member is movably mounted with respect to a fluid passage in a valve body, such as a sluice gate, can employ the principles of the invention and achieve the corresponding results.

I claim:

1. A valve for installation in a flume or the like in a preformed groove therein, said butterfly valve comprising: means defining a valve body having a fluid passage extending therethrough, a shape corresponding to that of the cross section of the flume in which it is to be installed in a size corresponding to that of the groove in the flume in which said valve is to be installed, said valve body further having a width less than the width of the groove in the flume in which said valve is to be installed; a valve member in said fluid passage and mounted for movement in said valve body between a first position wherein said fluid passage is open and a second position wherein said fluid passage is closed; and means for securing said valve body in said preformed groove including a tongue secured to said valve body and extending outwardly therefrom at the periphery thereof in a direction substantially parallel to said fluid passage, and means for securing said tongue to the bottom of a groove in a flume at a plurality of spaced locations.

2. A valve according to claim 1 wherein said securing means comprises a plurality of bolts extending in apertures of said tongues, each of said bolts adapted to be received in an anchor located in a wall of the flume in the groove thereof.

3. A valve according to claim 2 wherein said tongue is defined by one leg of an L-shaped angle iron, the other leg of said L-shaped angle iron being secured to said valve body at a plurality of spaced locations.

4. A valve according to claim 3 wherein said valve body is defined by an outwardly open, C-shaped channel and said other leg of said angle iron is secured to one leg of said C-shaped channel, said channel being adapted to be filled with grout at the time of installation of said valve in a preformed groove in a flume to provide a seal between said valve body and said groove.

5. A butterfly valve according to claim 4 wherein said valve member is a valve disc journalled for rotation in said fluid passage.

* * * * *